United States Patent [19]

Taylor

[11] 3,833,764

[45] Sept. 3, 1974

[54] MULTIPLE VIEWING SURFACE DISPLAY

[75] Inventor: Arthur Roger Taylor, Kirkwood, N.Y.

[73] Assignee: The Singer Company, Binghamton, N.Y.

[22] Filed: Dec. 14, 1972

[21] Appl. No.: 314,966

[52] U.S. Cl. ............................... 178/7.5 D, 178/6.8

[51] Int. Cl. ............................................ H04n 5/68

[58] Field of Search..... 178/7.5 D, DIG. 35, DIG. 1, 178/6.8, 7.85, 7.88; 35/12 N; 350/174

[56] References Cited

UNITED STATES PATENTS

| | | | |
|---|---|---|---|
| 3,071,706 | 1/1963 | Waldorf | 313/70 |
| 3,659,920 | 5/1972 | McGlasson | 35/12 N |
| 3,697,681 | 10/1972 | McCoy | 178/6.8 |

*Primary Examiner*—Robert L. Richardson
*Assistant Examiner*—Mitchell Saffian
*Attorney, Agent, or Firm*—James C. Kesterson; Leonard Weiss

[57] ABSTRACT

The faces of a pair of cathode ray tubes are optically combined to provide a viewing surface. The beam of each cathode ray tube traces a display raster, the lines thereof being optically combined to overlap and the modulation of a video signal being selectively gated therewith to vary the intensity of the beams, thereby providing a modulated composite raster for producing a desired scene having a desired deployment on the viewing surface. The composite raster appears to an observer as being traced by a single beam which has an intensity in accordance with the video signal.

3 Claims, 5 Drawing Figures

MULTIPLE VIEWING SURFACE DISPLAY

BACKGROUND OF THE INVENTION

1. Field of the Invention

This invention relates to cathode ray tube displays and more particularly to apparatus for providing an image on a viewing surface comprised of a plurality of cathode ray tubes.

2. Description of the Prior Art

In providing an image on the face of a cathode ray tube (CRT), typically the beam thereof is deflected to trace an array of evenly-spaced horizontal lines from left to right across the face. The array of lines is referred to in the art as a raster.

The first line of the raster is usually traced across the top of the face. Thereafter, during a horizontal retrace time, the beam is rapidly deflected to the left-hand side of the face to point slightly lower than the start of the first line, and the succeeding line is traced. After the lowest line on the face is traced, the beam is deflected during a vertical retrace time to the upper left-hand side of the face, and the top line of another raster is traced.

Usually, the CRT is biased below cutoff during the retrace times thereby preventing the trace of the beam from appearing on the face. An image is displayed upon the face by varying the intensity of the beam as the raster is traced.

In a display system for a flight simulator, for example, it may be desirable to provide a curvelinear viewing surface which simulates the windshield of the cockpit of an aircraft. An image on the curvelinear viewing surface simulates the view through the windshield.

Typically, the curvilinear viewing surface is formed by optical apparatus which combines the images on the faces of a plurality of adjacent CRT's. The optical apparatus may, as a first example, form a viewing surface equivalent to the faces of a pair of CRT's disposed side-by-side where the right-hand side of the face of one of the piar is in abutment with the left-hand side of the face of the other. The optical apparatus may, as a second example, form a viewing surface equivalent to the faces of a pair of CRT's where the bottom of the face of one of the pair is in abutment with the top of the face of the other. Viewing surfaces may be formed where the sides, the top and bottom of the faces of a CRT are all in abutment. Viewing surfaces of the type referred to hereinbefore are disclosed by McGlasson in U.S. Pat. No. 3,659,920 and by McCoy in U.S. Pat. No. 3,697,681.

In providing a composite raster on the viewing surface comprised of a first and a second CRT disposed side-by-side, a horizontal line which begins on the face of the first CRT is traced by the beam thereof to a point where the face of the first CRT is in abutment with the face of the second CRT. The beam of the first CRT is then retraced and the beam of the second CRT traces the line across the face thereof from the point of abutment thereby providing a continuous horizontal raster line. The composite raster is provided in response to time signals from a digital computer. In providing the composite raster in accordance with McCoy and McGlasson, a seam may appear along a discontinuity where the line traced by the beam of the first CRT ends and a line traced by the beam of the second CRT begins. The seam appears to an observer who is displaced from a centrally located eyepoint. The seam is undesirable because it degrades the simulation of the view through the windshield.

SUMMARY OF THE INVENTION

An object of the present invention is to provide an image on a viewing surface comprised of a plurality of faces of cathode ray tubes which are optically combined.

Another object of the present invention is to deploy an image on a viewing surface comprised of a plurality of faces of cathode ray tubes which are optically combined.

Still another object of the present invention is to provide an image of a desired horizontal and vertical extent on a viewing surface comprised of a plurality of faces of cathode ray tubes which are optically combined.

According to the present invention, the faces of a plurality of cathode ray tubes are optically combined to overlap portions thereof and provide a viewing surface; the beams of said tubes respectively trace display rasters thereon, said display rasters being combined to form a composite raster of composite raster lines with an intensity thereof in proportion to a video signal, said composite raster lines being simultaneously traced on the overlapping portions by the beams of the tubes associated therewith; an image is deployed on said viewing surface in response to said video signal being selectively gated to said tubes.

When the faces of cathode ray tubes are optically combined to form a viewing surface, the present invention provides thereon an image which appears to an observer as being traced by a single beam having an intensity in accordance with a video signal.

Other objects, features and advantages of the present invention will become more apparent in the light of the following detailed description of a preferred embodiment thereof as illustrated in the accompanying drawing.

DESCRIPTION OF THE PREFERRED EMBODIMENT

For illustrative purposes, and in order to enable the teaching of the principles of the invention without unduly complicating the details thereof, the exemplary embodiment disclosed herein includes two cathode ray tubes having faces which are optically combined to form a single viewing surface. The viewing surface is formed somewhat similar to that disclosed in the patents of McGlasson and McCoy referred to hereinbefore. According to the present invention, an image is displayed on the viewing surface in response to a video signal from a video source. The deployment of the image on the viewing surface is in response to the signals provided by a simulator computer.

Figure 1:
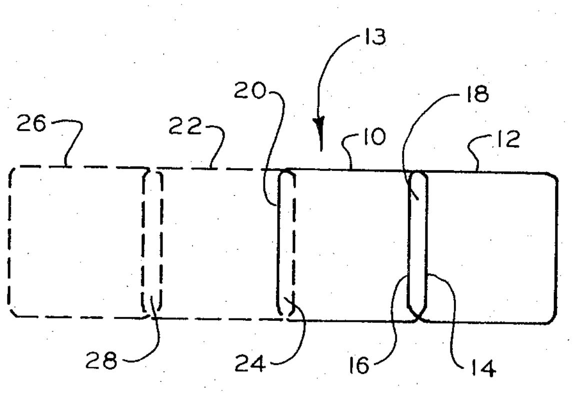
FIG. 1 is a schematic block diagram of a pair of phantom faces and a pair of CRT faces which have been optically combined.

Referring now to FIG. 1, similar CRT faces 10, 12 of a first and a second cathode ray tube, respectively, are optically combined to form a single viewing surface 13. In the optical combination, the CRT faces 10, 12 have sides 14, 16, respectively, which overlaps in an overlap region 18.

In the present invention, the beam of the first CRT traces a display raster on the CRT face 10 while the beam of the second CRT traces a display raster on the CRT face 12. When a CRT beam traces a portion of a raster line, a visible display is provided only when the video signal is gated to proportionally vary the intensity of the beam. Selective gating of the video signal combines those visible portions of the the raster lines of the display rasters to provide visibly composite raster lines. A composite raster line beginning on a side 20 of the CRT face 10 may, for example, be traced by the first CRT beam through the overlap region 18. Within the region 18 the composite raster line is simultaneously traced by the second CRT beam. Thereafter, the first CRT beam is retraced and a succeeding portion of the composite raster line is traced by the second CRT beam across the CRT face 12. A composite raster line traced as described hereinbefore appears to an observer as a single raster line traced across the viewing surface 13 by a single beam having an intensity in accordance with the video signal.

In the exemplary embodiment, a plurality of visible portions of composite raster lines are displayed on the viewing surface 13 whereby the image has the same vertical extent as one of the CRT faces 10, 12; the horizontal extent is intermediate to the horizontal extent of one of the faces 10, 12 and the viewing surface 13. Alternative embodiments may provide images of any desired horizontal and vertical extents, as explained hereinafter.

The image may have any desired horizontal employment on the viewing surface 13 whereby the entire image or a portion thereof is displayed. When the right side of a portion of an image is displayed on the CRT face 10, the left side of the image may be thought of as extending onto a phantom face, as described hereinafter.

A phantom face 22 having the same dimensions as the CRT face 10 overlaps the side 20 in an overlap region 24 similar to the region 18. The phrases "phantom face," "phantom beams," etc., are used at various locations throughout the specification for the purpose of explaining the operation of the present invention. Therefore, it should be understood that these terms do not refer to actual structure of the apparatus (i.e., CRT faces or CRT beams), but are in fact non-existent or fictitious and are included only to help in the understanding of the present invention. In a similar manner, a phantom face 26, of the same dimensions as the CRT face 10, overlaps the phantom face 22 in an overlap region 28 similar to the region 18. Display rasters may be thought of as being traced on the phantom faces 22, 26 by first and second phantom beams, respectively, which may be combined with the display rasters on the CRT face 10, 12 to provide a composite display raster (comprised on the composite raster lines) traced on a viewing surface which includes the faces 10, 12, 22, 26.

Figure 2:
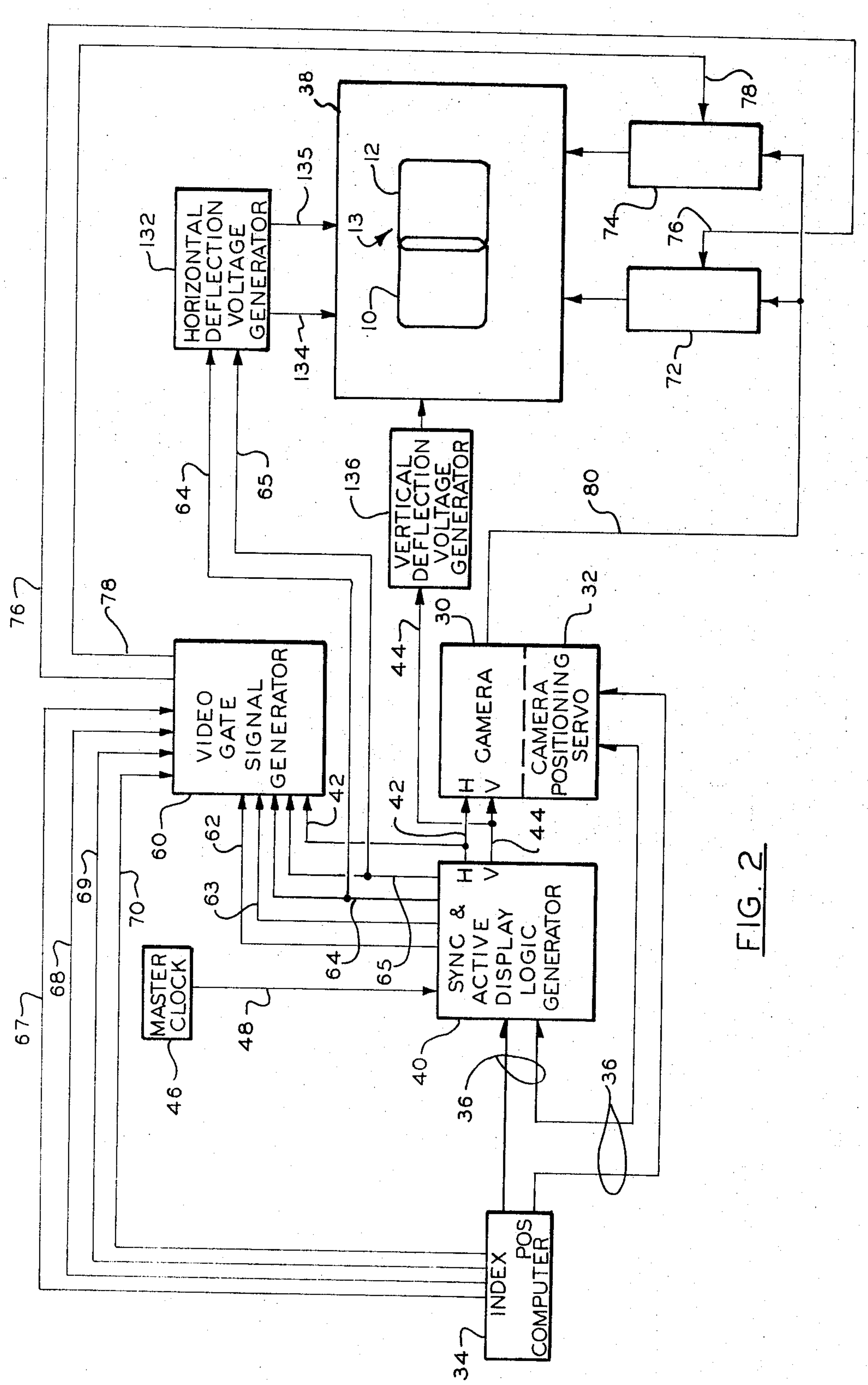
FIG. 2 is a block diagram of a preferred embodiment of the present invention.

Referring now to FIG. 2, the video source referred to hereinbefore is a TV camera 30 which provides a video signal representative of a scene viewed by an optical input of the camera 30. The camera 30 is mounted upon a camera positioning servomechanism 32 which is connected to a simulator computer 34 through signal lines 36. In the exemplary embodiment, the computer 34 provides to the servomechanism 32 a position signal which is a binary representation of the desired pointing angle of the optical input of the camera 30. In response to the position signal, the servomechanism 32 moves the camera 30 thereby providing a desired pointing angle whereby the optical input views a desired scene.

The camera 30 is of the type where a viewing raster is traced by a line of sight from the optical input to the scene. The video signal provided by the camera 30 has an instantaneous value representative of the view along the line of sight. As explained hereinafter, the video signal is selectively gated into a display unit 38 containing the viewing surface 13 whereon the image, which is representative of the scene, is displayed. In this embodiment, the desired deployment or placement of the image is in accordance with the pointing angle.

The viewing raster is traced in response to horizontal and vertical sync signals provided to the camera 30 by a sync and active display generator 40 through signal lines 42, 44, respectively. The generator 40 has inputs connected to the computer 34 through the lines 36 and to a master clock 46 through a signal line 48. The generator 40 provides the sync signals in response to clock pulses provided by the master clock 46. Timing signal sources, such as the master clock 46, are well known in the art.

Figure 3:
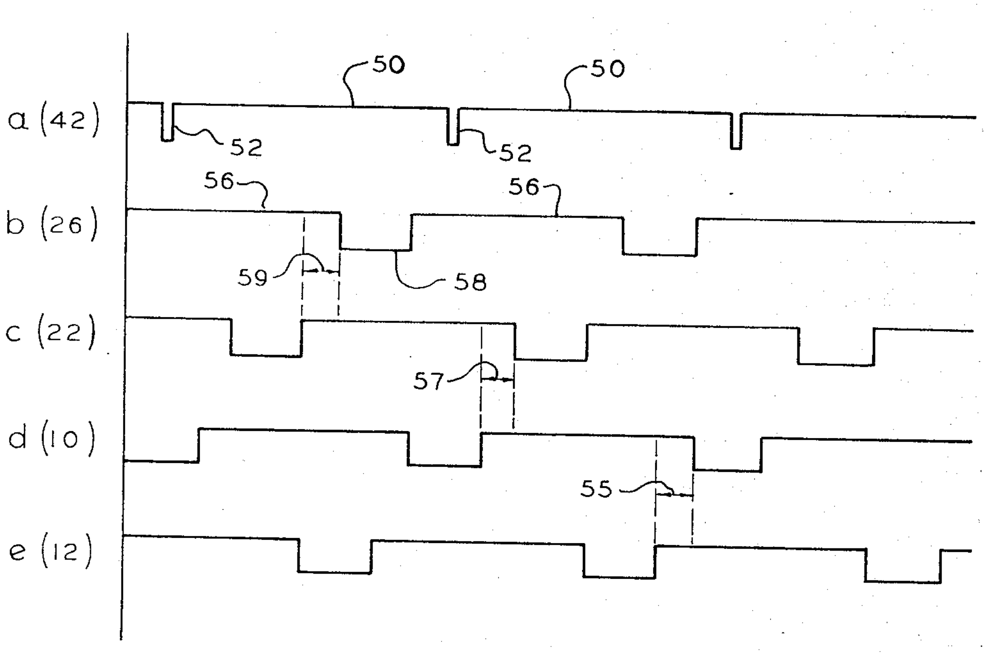
FIG. 3 is an illustration of different signals relationships, all on the same time base, in the preferred embodiment of FIG. 2.

Illustration a, FIG. 3, is a representation of the horizontal sync signal provided to the camera 30. Segments 50, 52 are respectively representative of when a viewing raster line is being traced and retraced.

On the segment 50, a point moving from left to right is representative of the line of sight tracing a viewing raster line. The times during which a viewing raster line is traced and retraced are respectively referred to as active and inactive times of the camera 30.

In this embodiment the camera 30 is active in response to a logic signal level of approximately 3.5 volts (referred to as logic ONE hereinafter) provided by the generator 40; in response to ground (referred to as logic ZERO hereinafter) the camera is inactive. In other embodiments other suitable logic levels may be used.

In concurrent response to the clock pulses and the position signals, the generator 40 provides active display signals (as will be discussed hereinafter with respect to FIGS. 3(*b*) through 3(*e*)) representative of when the display raster lines may be thought of as being traced across the phantom faces 22, 26 and when the display raster lines are traced across the faces 10, 12 (FIG. 1). The generator 40 is comprised of apparatus well known to those skilled in the art and is described hereinafter. In the exemplary embodiment, the active display signals and the horizontal sync signals all have the same repitition rate since the display signals are responsive to the horizontal sync signals.

It should also be understood that the active display signals have a fixed relationship to each other with respect to time. However, the relationship with respect to time of the horizontal sync signals to the active display signals is in accordance with the position signal.

In the preferred embodiment, the computer 34 provides an index signal on one of the lines 67 through 70 to identify on which of the faces 10, 12, 22, 26 the left edge of the image is to begin. When the CRT face 10 is identified by a signal on line 70, for example, the left edge of the image will begin thereon.

Illustration b, FIG. 3, is representative of the active display signal for the phantom face 26. Segments 56, 58 are repsectively representative of when a display raster line may be thought of as being traced and retraced. On the segment 56, a point moving from left to right is representative of the second phantom beam (that phantom beam associated with phantom face 26) tracing a display raster line. Accordingly, the segments 56, 58 are respectively referred to as active and inactive times of the phantom face 26. Illustrations c–e, of FIG. 3, are correspondingly representative of active and inactive times of the faces 22, 12, 10. Similar to the horizontal sync signal, active display signals having the values ONE and ZERO are respectively representative of active and inactive times. It should be understood that the overlap regions 18, 24, 28 are associated with three pairs of simultaneously active faces which are the CRT faces 10, 12, the CRT face 10 and the phantom face 22 and the phantom faces 22, 26. The overlap regions 18, 24, 28 correspond to times indicated by arrows 55, 57, 59, respectively.

The ratio of the active time of the camera 30 to the active time of the faces 10, 12, 22, 26 determines the horizontal extent of a displayed image on the viewing surface 13. When, for example, the active time of camera 30 is equal to the active time of any one of the faces, a viewing raster line and a display raster line is of the same duration, whereby the image has the horizontal extent of one of the faces 10, 12, 22, 26. Accordingly, the horizontal extent of the image is modified by modification of the ratios of the active to the inactive times of the camera 30. In alternative embodiments, the repitition rate of the horizontal sync signals may be half the repitition rate of one of the active display signals whereby the horizontal extent of the image may be more than twice the horizontal extent of one of the faces 10, 12, 22, 26.

The active display signals for the faces 26, 22, 12, 10 and the horizontal sync signal are provided by the generator 40 (FIG. 2) to a video gate signal generator 60 through signal lines 62–65, respectively. The gate signal generator 60 receives from the computer 34 through signal lines 67–70 index signals which identify one of the faces 10, 12, 22, 26 desired for the display of the left edge of the image. ONE provided on the line 67 is indicative of the desired display of the left edge of the image on the phantom face 26. Alternatively, ZERO provided on the line 67 is indicative of the desired display of the left edge of the image on one of the faces 22, 10, 12. In a similar manner, ONE's on the line 68–70 are respectively indicative of the desired display of the left edge of the image on the faces 22, 10, 12.

The gate signal generator 60 provides first and second gate logic signals to video gates 72, 74 through signal lines 76, 78, respectively. The gates 72, 74 receive the video signals from the camera 30 through a signal line 80. The outputs of the gates 72, 74 are connected to the display 38 to respectively provide the video signal to the first and second CRT's. In response to the gate logic signals being ONE, the video signal is respectively provided through the gates 72, 74 to the first and second CRT's. As explained hereinafter, the gate signal generator 60 provides gate logic signals for the generation of the composite raster described hereinbefore.

Figure 4:
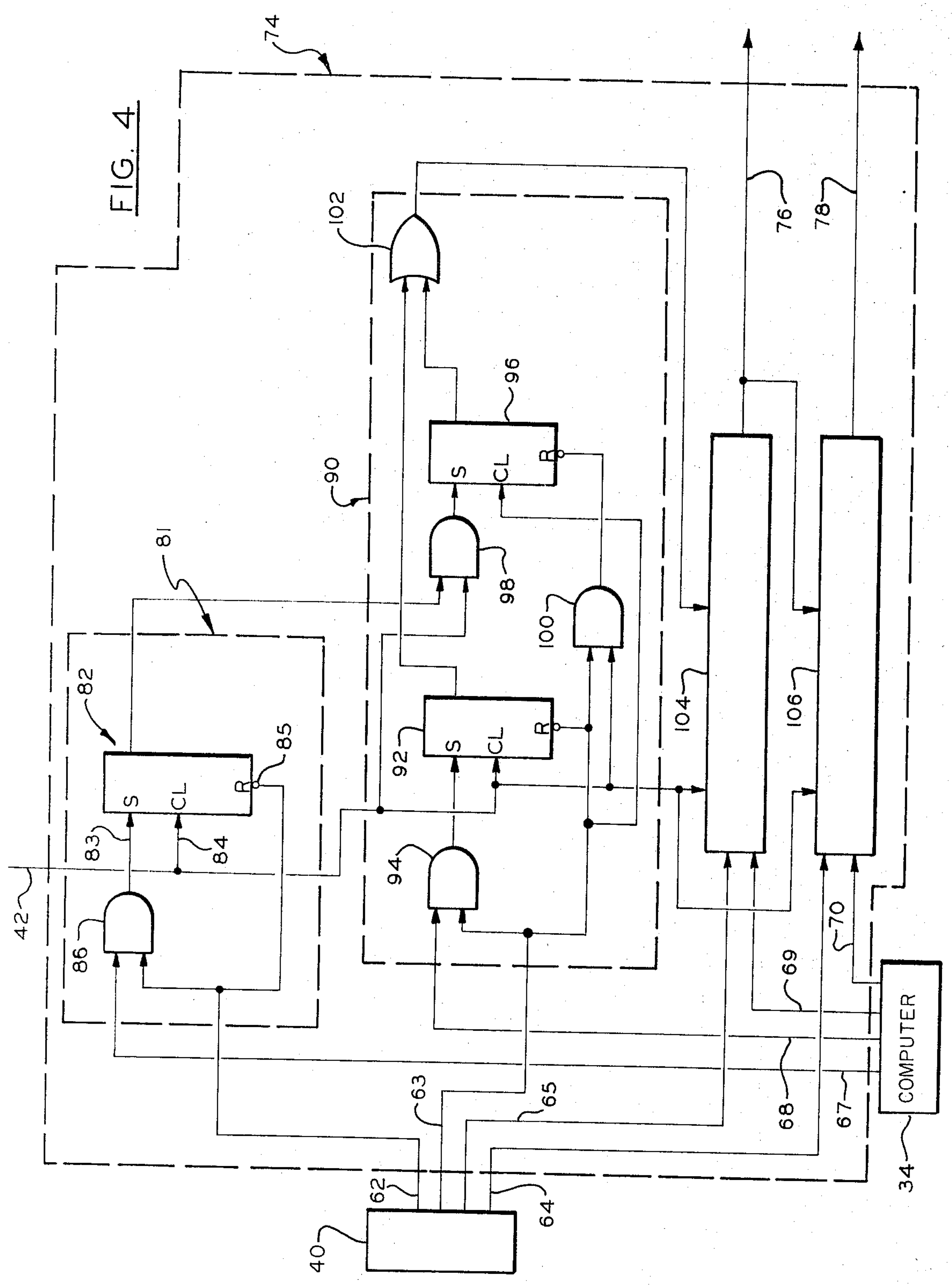
FIG. 4 is a schematic block diagram of a video gate signal generator which may be used in the preferred embodiment of FIG. 2.

Referring now to FIG. 4, the video gate generator 60 is comprised of a pair of phantom gate signal generators and a pair of CRT gate signal generators. The gate signal generator provides logic signals indicative of when the appropriate segment of a composite raster line are being traced on the CRT faces 10, 12, 22, 26.

Phantom gate signal generator 81, for example, provides ONE as an indication of the phantom beam is tracing a portion of the composite raster line on the phantom face 26. The gate signal generator 81 includes a flip-flop 82 with a set input 83, a clock input 84 and an asynchronous reset input 85 connected respectively to the output of an AND gate 86 and the lines 42 and 62. In concurrent response to ONE being provided at the set input 63 and at the same time a transition from ZERO to ONE occurs at the clock input 84, ONE is provided at the output of the flip-flop 82; when ZERO is provided at the asynchronous reset input 85, ZERO is provided at the output.

The AND gate 86 has a pair of inputs respectively connected to the lines 62, 67. The output of the gate 86 provides ONE in concurrent response to ONE's at the inputs thereof whereby the gate 86 provides ONE when both the phantom face 26 is active and the left edge of the image is to be generated on phantom face 26. Therefore, the flip-flop 82 provides ONE when the gate 86 provides ONE concurrently with the camera 30 becoming active (the start of the trace of a viewing raster line is indicated by a signal on line 42); ZERO is provided by the flip-flop 82 in response to the phantom face 26 being inactive. Therefore, the flip-flop 82 provides ONE when the remaining portion of the composite raster line is portion of the image on the phantom face 26. It should be understood that, that portion of the image generated by a composite raster line traced on the phantom face 26 always starts thereon and will normally extend past the right side thereof because the horizontal extent of the image is typically greater than the horizontal extent of the phantom face 26.

A phantom gate signal generator 90 provides ONE when a portion of the image is being generated by the composite raster line traced on the phantom face 22. It should be understood that an image line on the phantom face 22 starts on either the phantom face 22 or the phantom face 26.

The gate signal generator 90 includes a flip-flop 92 with a set input connected to the output of an AND gate 94. The flip-flop 92 and the gate 94, which are respectively similar to the flip-flop 82 and the gate 86, are in the same configuration as the gate signal generator 81. The gate 94 has a pair of inputs respectively connected to the lines 63, 68 whereby the output of the gate 94 provides ONE when the phantom face 22 is active concurrently with the desired deployment thereon of the left edge of the image. A clock input of the flip-flop 92 is connected to the line 42 thereby causing the output of the flip-flop 92 to provide ONE when the gate 94 provides ONE concurrently with the camera 30 becoming active. Therefore, the flip-flop 92 provides ONE when a composite raster line on the phantom face 22 was started thereon.

As asynchronous reset input of the flip-flop 92 is connected to the line 63 whereby ZERO is provided by the flip-flop 92 in response to the phantom face 22 being inactive.

The phantom gate generator 90 further comprises a flip-flop 96 with a set input and an asynchronous reset input respectively connected to the outputs of AND gates 98, 100. The flip-flop 96 and the gates 98, 100 are respectively similar to the flip-flops and the gates described hereinbefore. The gate 98 has a pair of inputs respectively connected to the output of the phantom gate generator 81 and the line 42 whereby the output of the gate 98 provides ONE when a composite raster line is traced on the phantom face 26 concurrently with the camera 30 being active. A clock input of the flip-flop 96 is connected to the line 63 thereby causing the output of the flip-flop 96 to provide ONE when the gate 98 provides ONE concurrently with the phantom face 22 becoming active. The phantom gate generator 81 providing ONE concurrently with the face 22 becoming active is indicative of a composite raster line traced at the left edge of the overlap region 28 (FIG. 1). Therefore, the flip-flop 96 provides ONE when a composite raster line on the phantom face 22 carrying an image was started on the phantom face 26 or in the overlap region 28.

The inputs of the gate 100 are respectively connected to the lines 42, 63 whereby the gate 100 provides ZERO (causing the flip-flop 96 to provide ZERO) when either the phantom face 22 becomes inactive or the camera 30 becomes inactive.

The outputs of the flip-flops 92, 96 are respectively provided to a pair of inputs of an OR gate 102. ONE is provided by gate 102 in response to either of its inputs having ONE applied thereto. Accordingly, the output of the gate 102 is the output of the gate signal generator 90 where ONE is provided whenever a composite raster line is traced on the face 22.

A CRT gate signal generator 104, which is similar to the gate signal generator 90, provides ONE when a portion of a composite raster line is traced on the CRT face 10. The gate signal generator 104 has inputs connected to the output of the gate signal generator 90 and the lines 42, 65, 69 which respectively correspond to the connection of the output of the gate signal generator 81 and the lines 42, 43, 68 to the gate signal generator 90. The output of the gate signal generator 104 is connected to the video gate 72 through the line 76 as described hereinbefore.

A CRT gate signal generator 106 similar to the gate signal generator 90 provides ONE when a portion of a composite raster line is traced on the CRT face 12. The gate signal generator 106 has inputs connected to the output of the gate signal generator 104 and lines 42, 64, 70 which respectively correspond to the connection of the output of the gate signal generator 81 and the lines 42, 63, 68 to the gate signal generator 90. The output of the gate signal generator 106 is connected to the video gate 74 through the line 78 as described hereinbefore.

Figure 5:
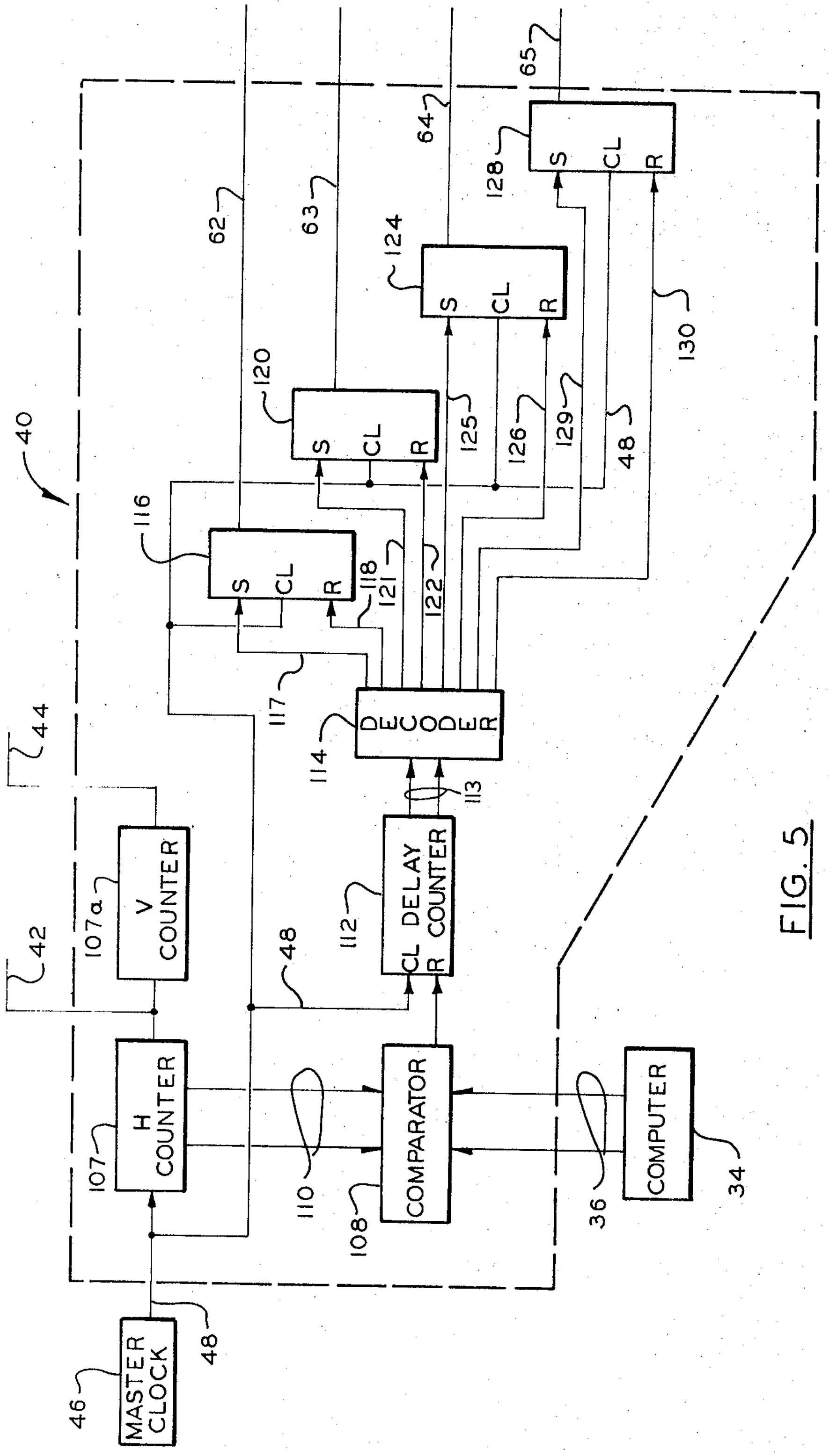
FIG. 5 is a schematic diagram of a sync and active display logic generator which may be used in the preferred embodiment of FIG. 2.

Referring now to FIG. 5, the generator 40 is comprised of a binary counter 107 which has a count input connected to the master clock 46 through the signal line 48. The counter 107 is of a well known type which has a plurality of binary stages, each of which provide a logic signal. The counter 107 counts the pulses provided by the master clock 46, the number of counted pulses being indicated by the logic signals provided by the binary stages. When the counter 107 counts to a maximum count, a clock pulse resets the counter 107 to provide a count of zero and succeeding pulses are thereafter counted. In response to a maximum count, the counter 107 provides ZERO on the line 42; ONE is otherwise provided on the line 42. The frequency of the clock 46 and a number of binary stages in the counter 107 are selected to provide a horizontal sync signal on the line 42.

The logic signals provided by the stages of the counter 107 are connected to a first group of inputs of a comparator 108 through signal lines 110. A second group of inputs of the comparator 108 are connected to the computer 34 through the lines 36. The comparator 108 is a well-known type of comparator which compares the count in the counter 107 with the position signal. In response to an equality, the comparator 108 provides ZERO at the output thereof.

The output of the comparator 108 is connected to the reset input of a binary counter 112. A count input of the counter 112 is connected to the master clock 46 through the line 48. The counter 112, which is similar to the counter 107, counts pulses provided by the master clock 46. In response to ZERO provided at the reset input, the counter 112 is reset to provide a count of zero. Therefore, the difference in the count stored in the counters 107, 112 equals the value of the position signal.

The logic signal outputs of the stages of the counter 112 are connected through signal line 113 to a decoder 114 which provides four pairs of decoder output signals. Each decoder output provides ONE in response to the counter counting a predetermined count. Decoders are well-known to those skilled in the digital circuit art.

The first pair of decoder outputs is associated with the predetermined counts which determine the timing of the transitions from ONE to ZERO and ZERO to ONE, respectively, of the active display signal for the phantom face 26 (Illustration b, FIG. 3). Correspondingly, the second, third and fourth pairs of decoder outputs are respectively associated with the predetermined counts which determine the timing of the transitions from ONE to ZERO and ZERO to ONE of the active display signals for the faces 22, 10, 12, respectively.

The decoder 114 is connected to set and reset inputs of a flip-flop 116 through signal lines 117, 118, respectively, whereby the first pair of decoder outputs is provided to the flip-flop 116. A clock input of the flip-flop 116 is connected to the master clock 46 through the lines 48. The flip-flop 116 is of the type which provides an output of ONE when ONE and ZERO are respectively provided to the set and reset inputs and a clock pulse is provided to the clock input; ZERO is provided in response to ZERO and ONE being respectively provided to the set and reset inputs when a clock pulse is provided.

In response to the counter 112 providing a first predetermined count, ONE is provided on the line 118 whereby the following clock pulse causes the flip-flop 116 to provide ZERO. In response to a second predetermined count, ONE is provided on the line 117 whereby the following clock pulse causes the flip-flop 116 to provide ONE. The flip-flop 116 thereby provides the active display signal for the face 26.

In a similar manner, a flip-flop 120 has set and reset inputs connected to the decoder 114 through signal lines 121, 122 whereby the second pair of decoder outputs are provided to the flip-flop. Additionally, a clock input of the flip-flop 120 is connected to the master clock 46 through the signal line 48 whereby the flip-flop 120 provides the active display signal for the phantom face 22.

A flip-flop 124 similar to the flip-flop 116, has set and reset inputs connected to the decoder 114 through signal lines 125, 126 whereby the third pair of decoder outputs are provided to the flip-flop 124. Additionally, a clock input of the flip-flop 124 is connected to the line 48 whereby the flip-flop 124 provides the active display signal for the CRT face 10.

A flip-flop 128, similar to the flip-flop 116, has set and reset inputs connected to the decoder 114 through signal lines 129, 130 whereby the fourth pair of decoder outputs are provided to the flip-flop 128. Additionally, a clock input of the flip-flop 128 is connected to the line 48 whereby the flip-flop 128 provides the active display signal for CRT face 12.

Since the counts of the counters 107, 112 differ by the value of the position signals, the flip-flops 116, 120, 124, 128 provide active display signals (indicative of the faces 10, 12, 22, 26 being active) delayed from the horizontal sync signal (indicative of the camera being active) by the value of the position signal.

A counter **107*a* similar to the counter 107 has an input connected to the line 42. The counter 107*a* counts the pulses comprising the horizontal sync signal. The number of binary stages of the counter 107*a* are selected to provide the vertical sync signal on the line 44.**

Referring again to FIG. 2, the active display signals for the CRT faces 10, 12 are provided by the generator 40 to a horizontal deflection voltage generator 132 through the lines 64, 65, respectively. In response to the active display signals, the deflection generator 132 provides horizontal deflection voltages to the display 38 through signal lines 134, 135. The horizontal deflection voltages cause the horizontal component of the deflection of the CRT beams for the tracing of the display rasters described hereinbefore.

The generator 40 provides the vertical sync signal to a vertical deflection voltage generator 136 through the line 44. The vertical deflection generator provides a vertical deflection voltage which causes the vertical component of the deflection of the CRT beams for the tracing of the display rasters described hereinbefore.

Thus there has been shown apparatus for providing a composite raster on a viewing surface comprised of a plurality of faces of cathode ray tubes.

Although the invention has been shown and described with respect to a preferred embodiment thereof, it should be understood by those skilled in the art that various changes and omissions in the form and detail thereof may be made therein without departing from the spirit and the scope of the invention.

Having thus described a typical embodiment of my invention, that which I claim as new and desire to secure by letters patent of the United States is:

1. Apparatus for displaying an image generated by a plurality of cathode ray tubes comprising:

a source for producing video signals representative of a desired scene;

control means for providing control signals, including signals applied to said video source for controlling the selection of said desired scene represented by said produced video signals;

a plurality of cathode ray tubes responsive to said video signals for reproducing said desired scene and positioned such that a selected portion of the viewing surface of each cathode ray tube is optically combined to overlap a selected portion of the viewing surface of an adjacent cathode ray tube;

deflection means connected to said cathode ray tube for providing deflection signals to generate display raster lines on the viewing surface of said cathode ray tubes;

synchronization means responsive to a timing signal and said control signals for providing synchronization signals to synchronize producing of said video signals with the generation of said display raster lines on said viewing surfaces of said cathode ray tubes, and for synchronizing the generation of raster lines on each CRT to form a composite raster of composite raster lines, each of said composite raster lines being simultaneously traced on said overlapping portion of the viewing surfaces of adjacent cathode ray tubes; and gating means responsive to said control signals and said synchronization signals for applying said video signals to selected ones of said plurality of cathode ray tubes during the generation of a raster line thereon such that said desired scene is reproduced and selectively positioned on one or more of said cathode ray tubes, said video signals being applied to only one cathode ray tube at a time except said video signals are simultaneously applied to adjacent cathode ray tubes when said composite raster lines are generated in said overlapping portions of said viewing surfaces of said adjacent cathode ray tubes.

2. The apparatus of claim 1 wherein said video source is a TV camera and said control signals applied to said video source are positioning signals for controlling the scene viewed by said camera, said camera including means for generating a viewing raster such that said produced video signals are representative of the instantaneous view along a line of sight from the optical input of said camera to a point on said desired scene.

3. The apparatus of claim 1 wherein said control signals provided by said control means also include index signals applied to said gating means, which index signals are indicative of that cathode ray tube viewing surface on which said reproduced scene is to begin.

* * * * *